(12) United States Patent
Kiernan et al.

(10) Patent No.: US 8,548,113 B2
(45) Date of Patent: Oct. 1, 2013

(54) DEBRIS MITIGATION UPPER TIE PLATES AND FUEL BUNDLES USING THE SAME

(75) Inventors: Michael T. Kiernan, Wilmington, NC (US); Michael S. DeFilippis, Wilmington, NC (US)

(73) Assignee: Global Nuclear Fuel - Americas, LLC, Wilmington, NC (US)

( * ) Notice: Subject to any disclaimer, the term of this patent is extended or adjusted under 35 U.S.C. 154(b) by 897 days.

(21) Appl. No.: 12/549,823

(22) Filed: Aug. 28, 2009

(65) Prior Publication Data

US 2011/0051879 A1    Mar. 3, 2011

(51) Int. Cl.
*G21C 3/30* (2006.01)
*G21C 19/28* (2006.01)
*G21C 19/30* (2006.01)
*G21C 3/00* (2006.01)
*G21C 19/00* (2006.01)

(52) U.S. Cl.
USPC ........... 376/313; 376/277; 376/308; 376/310; 376/347; 376/409; 376/426; 376/434

(58) Field of Classification Search
USPC ............. 376/310–316, 352, 434, 438, 441, 376/277, 287, 409, 347, 426
See application file for complete search history.

(56) References Cited

U.S. PATENT DOCUMENTS

| | | | | |
|---|---|---|---|---|
| 4,486,045 A * | 12/1984 | Trygg | ............................ | 294/87.1 |
| 4,832,905 A * | 5/1989 | Bryan et al. | .................... | 376/352 |
| 4,849,161 A * | 7/1989 | Brown et al. | .................. | 376/313 |
| 4,900,507 A * | 2/1990 | Shallenberger et al. | ....... | 376/352 |
| 5,018,776 A * | 5/1991 | Trygg | .......................... | 294/119.3 |
| 5,024,806 A * | 6/1991 | Cioffi et al. | ..................... | 376/352 |
| 5,037,605 A * | 8/1991 | Riordan, III | .................... | 376/352 |
| 5,094,802 A * | 3/1992 | Riordan, III | .................... | 376/352 |
| 5,160,697 A * | 11/1992 | Verdier et al. | ................. | 376/352 |
| 5,390,220 A * | 2/1995 | Zuloaga et al. | ................ | 376/313 |
| 5,390,221 A * | 2/1995 | Dix et al. | ........................ | 376/352 |
| 5,420,901 A * | 5/1995 | Johansson | ...................... | 376/352 |
| 5,483,564 A * | 1/1996 | Matzner et al. | ................ | 376/352 |
| 5,539,793 A * | 7/1996 | Johansson et al. | ............. | 376/313 |
| 5,748,694 A * | 5/1998 | King | .............................. | 376/313 |
| 5,787,140 A * | 7/1998 | Dunlap et al. | ................. | 376/313 |
| 6,608,880 B2 * | 8/2003 | Smith et al. | ..................... | 376/352 |
| 6,690,758 B1 * | 2/2004 | Elkins | ............................ | 376/313 |
| 8,396,182 B2 * | 3/2013 | Smith et al. | ..................... | 376/277 |
| 2006/0018422 A1 * | 1/2006 | Mayer | ............................ | 376/409 |
| 2009/0060113 A1 * | 3/2009 | Elkins et al. | ................... | 376/287 |
| 2009/0060114 A1 * | 3/2009 | DeFilippis et al. | ............ | 376/313 |
| 2009/0080590 A1 * | 3/2009 | Smith et al. | ..................... | 376/313 |
| 2009/0092217 A1 * | 4/2009 | DeFilippis et al. | ............ | 376/313 |

FOREIGN PATENT DOCUMENTS

| | | |
|---|---|---|
| EP | 2 031 599 | 3/2009 |
| EP | 2 031 600 | 3/2009 |

OTHER PUBLICATIONS

Office Action for corresponding Spanish Application No. 201031253 dated May 29, 2013.

* cited by examiner

*Primary Examiner* — Bernarr Gregory
(74) *Attorney, Agent, or Firm* — Harness, Dickey & Pierce

(57) ABSTRACT

Example embodiments are directed to upper tie plates for debris mitigation and fuel bundles that use the upper tie plates. Example embodiment tie plates may include a plurality of debris capture elements that overlap each other so as to create debris traps for particulate debris that would fall onto the fuel bundle. Example embodiment fuel bundles may use the upper tie plates for debris mitigation.

20 Claims, 6 Drawing Sheets

DEBRIS MITIGATION UPPER TIE PLATES AND FUEL BUNDLES USING THE SAME

BACKGROUND

1. Field

Example embodiments generally relate to fuel structures and materials used in nuclear power plants.

2. Description of Related Art

Generally, nuclear power plants include a reactor core having fuel arranged therein to produce power by nuclear fission. A common design in nuclear power plants is to arrange fuel in a plurality of fuel rods bound together as a fuel assembly, or fuel bundle, placed within the reactor core. These fuel rods typically include several elements joining the fuel rods to assembly components at various axial locations throughout the assembly.

As shown in FIG. 1, a conventional fuel bundle 10 of a nuclear reactor, such as a boiling water reactor (BWR), may include an outer channel 12 surrounding an upper tie plate 14 and a lower tie plate 16. A plurality of full-length fuel rods 18 and/or part length fuel rods 19 may be arranged in a matrix within the fuel bundle 10 and pass through a plurality of spacers 15. Fuel rods 18 and 19 generally originate and terminate at the same vertical position, all rods continuously running the length of the fuel bundle 10, with the exception of part length rods 19, which all terminate at a lower vertical position from the full length rods 18. An upper end plug 20 and/or lower end plug 30 may join the fuel rods 18 and 19 to the upper and lower tie plates 14 and 16, with only the lower end plug 30 being used in the case of part length rods 19.

As shown in FIGS. 2A and 2B, conventional upper and lower tie plates 14 and 16 may be generally solid and flat. A plurality of holes, called bosses, 25 may receive lower end plugs of all rods in an assembly in the lower tie plate 16. Similarly, a plurality of bosses 25 may receive the upper end plugs of all full-length rods in the upper tie plate 14. Part length rods may not terminate at a tie plate. In this way, upper and lower tie plates 14 and 16 may axially join fuel rods to the fuel assembly and hold fuel rods at a constant and shared axial displacement in the core. Because bosses and corresponding fuel rods may begin and/or terminate at the same axial position within the bundle, fluid flow may be restricted at these axial positions.

A continuing problem during operation of a nuclear reactor is the existence of debris of various sizes. Examples of such debris may include small-sized fasteners, metal clips, welding slag, pieces of wire, etc. The debris may be generated as a result of the original construction of the reactor core, subsequent reactor operation and/or due to repairs made during a planned or unplanned maintenance outage. Current fuel designs do not prevent particulate debris from entering the top of the fuel bundle. As work is performed during outages, there is the possibility that debris can enter the top of the fuel bundles and cause a fuel failure.

SUMMARY

Example embodiments are directed to upper tie plates for debris mitigation. Example embodiment upper tie plates may have a plurality of debris capture elements above the plurality of bosses and configured to overlap each other. In this way, the plurality of debris capture elements may prevent or reduce debris from entering the top of a fuel bundle.

Example embodiment fuel bundles may use upper tie plates including the plurality of debris capture elements such that particulate debris is prevented or reduced from continually falling into a fuel bundle below and cause failed fuel rods.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Detailed illustrative example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
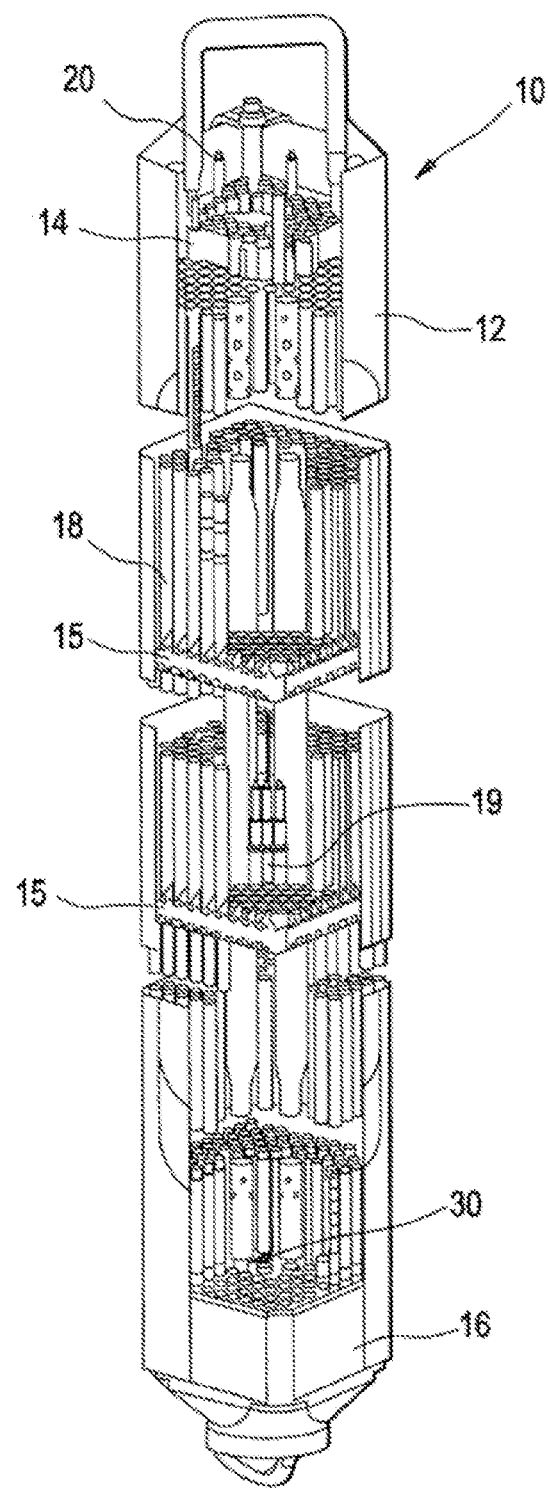
FIG. 1 is an illustration of a conventional art fuel assembly having flat tie plates affixed to fuel rods with shared vertical positions.
Figure 2A:
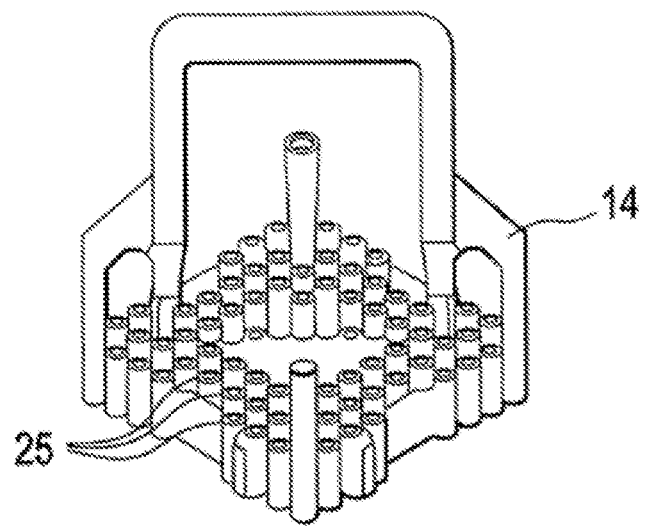
FIGS. 2A and 2B are illustrations of conventional flat upper and lower tie plates.
Figure 2B:
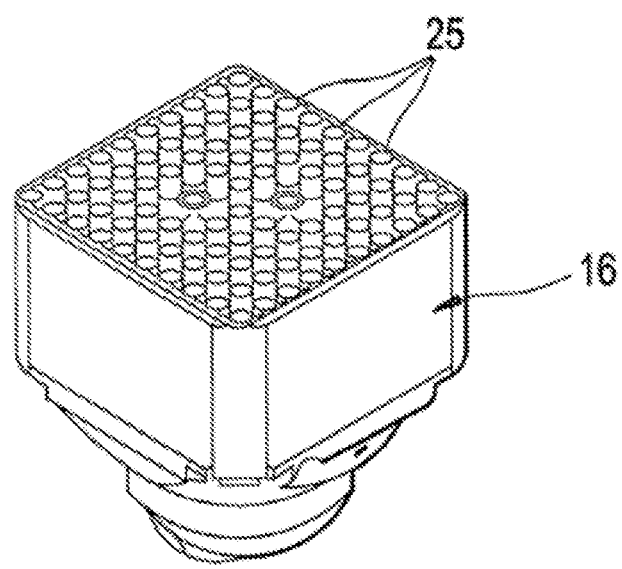
Figure 3:
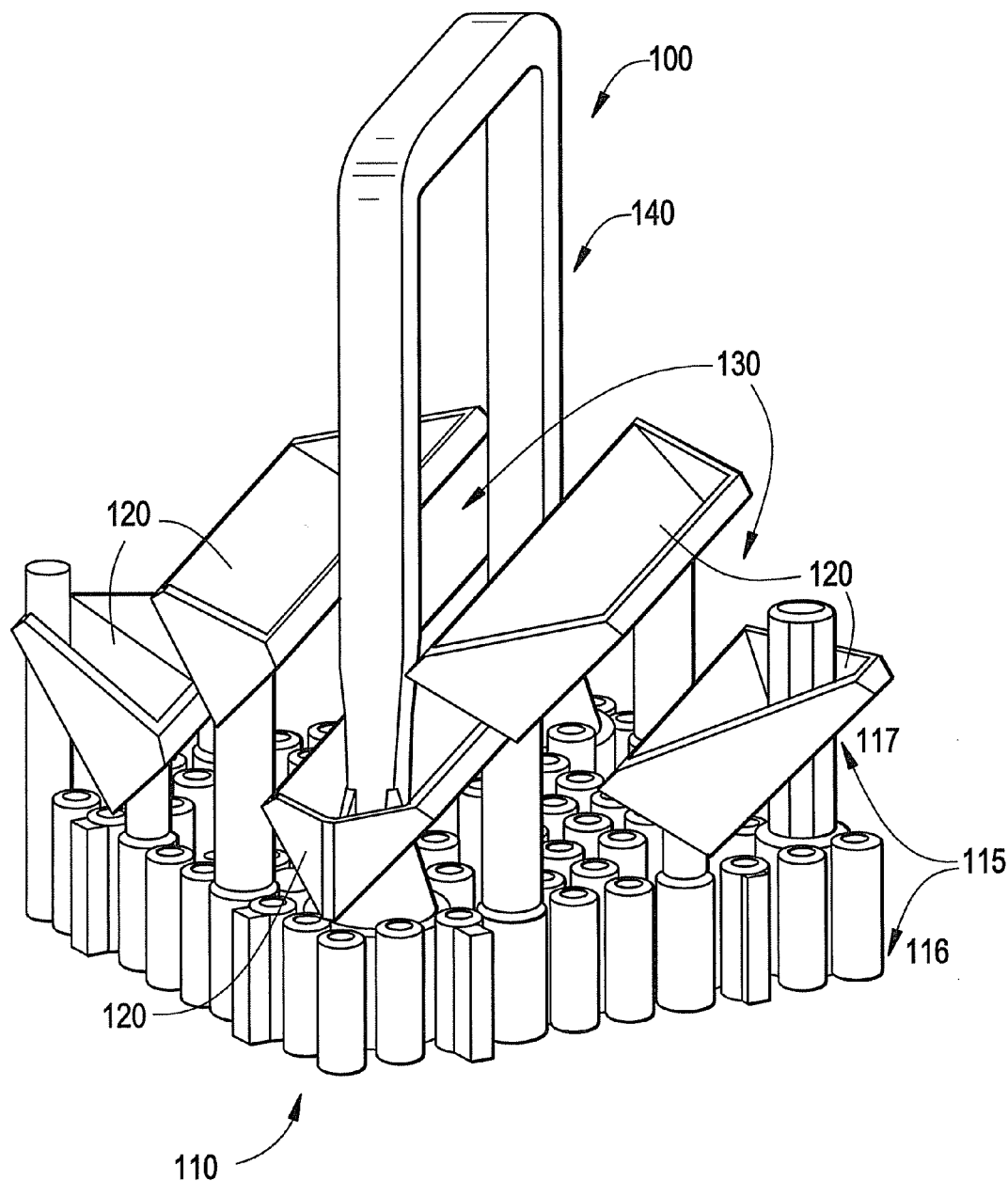
FIG. 3 is an isometric view of an example embodiment debris mitigation upper tie plate.

FIG. 3 is an isometric view of an example embodiment debris mitigation upper tie plate. As shown in FIG. 3, an example embodiment upper tie plate 100 includes a body 110 having a plurality of bosses 115 therein. Some of the plurality of bosses 117 may be longer in length than the other bosses 116. A plurality of debris capture elements 120 are formed on or connected to the plurality of bosses 117 or formed on the handle 140 of the upper tie plate 100. The plurality of debris capture elements 120 may overlap each other so as to create debris traps for particulate debris that would fall onto the fuel bundle.

The plurality of debris capture elements 120 may take on a variety of configurations. For example, the plurality of debris capture elements 120 may be one of troughs, conical features and/or any other shape that captures debris. The plurality of debris capture elements 120 may be at an angle with respect to a vertical direction to allow the debris to collect at one end and may be at different heights above the plurality of bosses 117. Sides of the debris capture elements 120 may be one of a triangular, rectangular, trapezoidal, and/or some other irregular shape.

At least two of the plurality of debris capture elements 120 are offset from one another by a flow area 130 between the plurality of debris capture elements 120, which minimizes or reduces the resulting pressure drop caused by the debris capture elements 120. The plurality of debris capture elements 120 may be integral with the upper tie plate 100 or may be coupled together in a separate assembly mounted on top of the upper tie plate 100. The above-described configuration of the plurality of debris capture elements 120 according to example embodiments allows for the falling debris to collect within. As such, the debris capture elements 120 may prevent or reduce particulate debris from continually falling into a fuel bundle below (not shown), thereby causing failed fuel rods.

Figure 4:
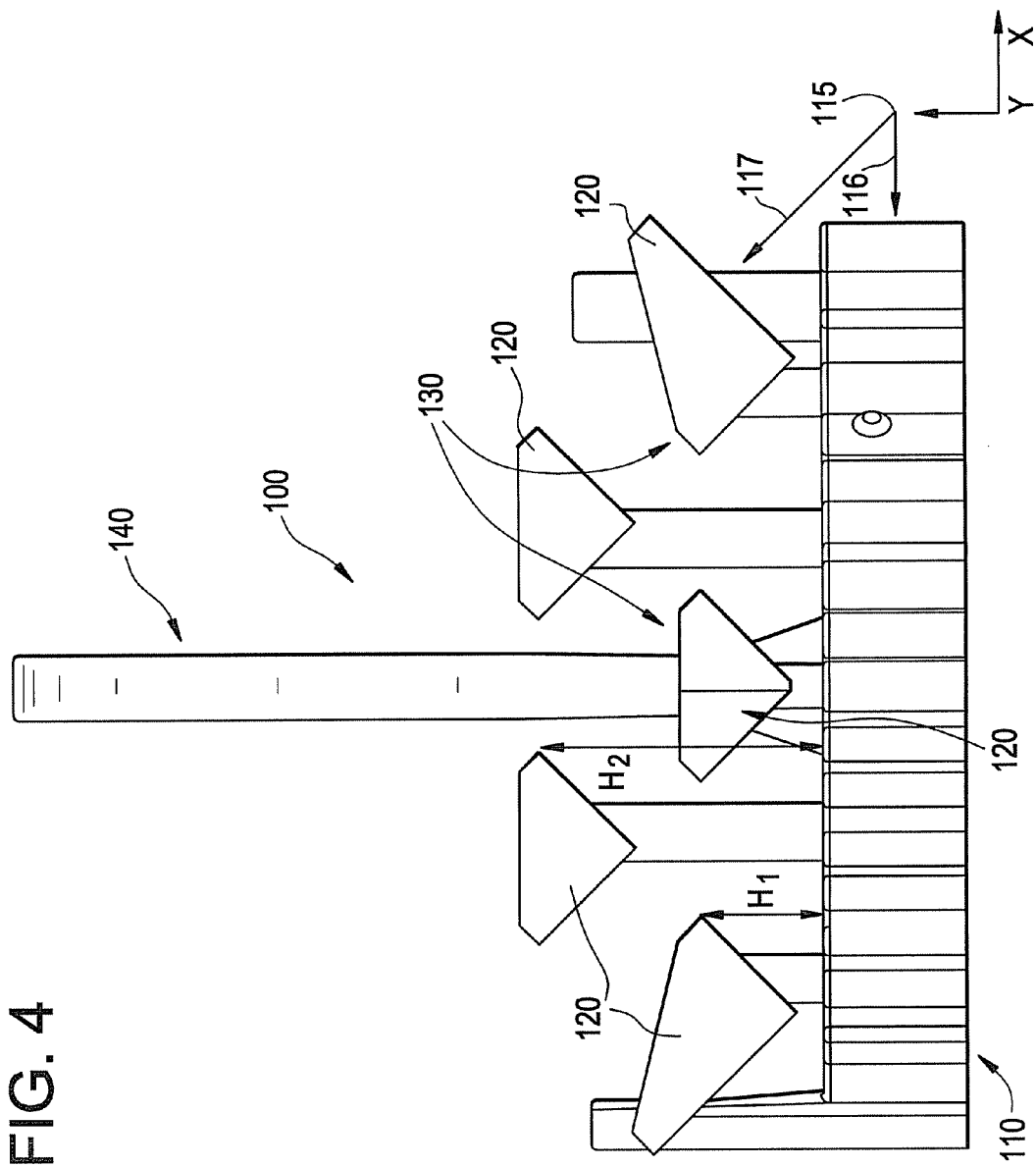
FIG. 4 is a side view of the example embodiment debris mitigation upper tie plate 100 as illustrated in FIG. 3.

FIG. 4 is a side view of the example embodiment debris mitigation upper tie plate 100 as illustrated in FIG. 3. As can be seen in FIG. 4, the plurality of debris capture elements 120 may be staggered along the y-axis. At least one of the plurality of debris capture elements 120 may be positioned at a height H1 along the y-axis. At least another one of the plurality of debris capture elements 120 may be positioned at a height H2, which is greater than the height H1, along the y-axis.

Figure 5:
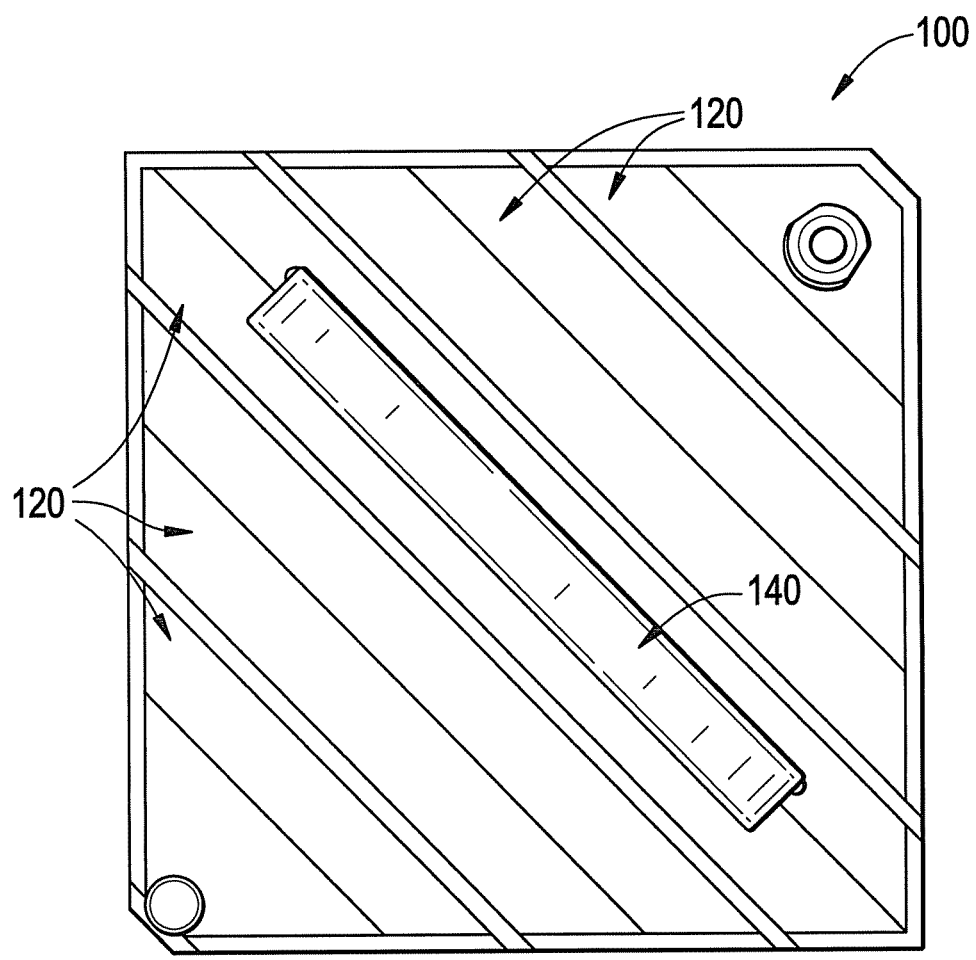
FIG. 5 is a plan view of the example embodiment debris mitigation upper tie plate 100 as illustrated in FIG. 3.

FIG. 5 is a plan view of the example embodiment debris mitigation upper tie plate 100 as illustrated in FIG. 3. As can be seen in FIG. 5, the plurality of debris capture elements 120 may overlap each other and the handle 140 completely so as to create debris traps for particulate debris that would fall onto the bundle.

Figure 6:
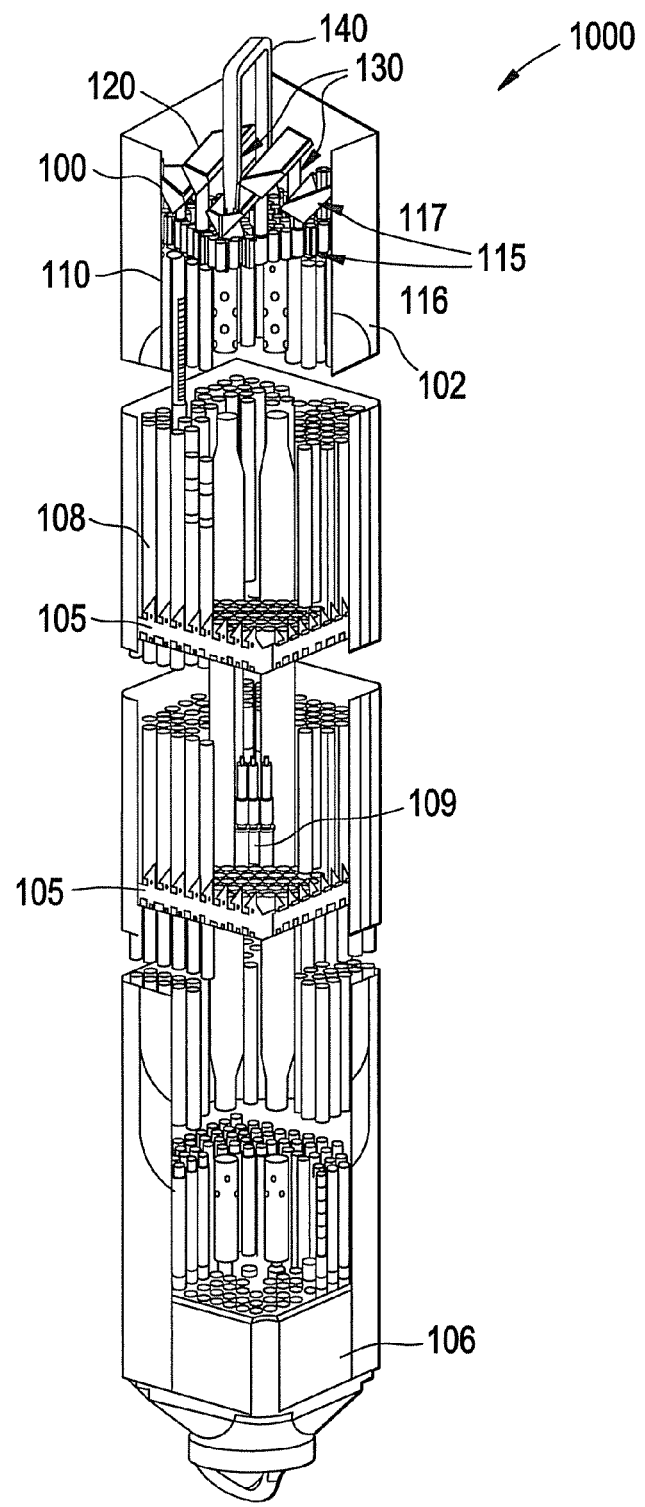
FIG. 6 is an illustration of a fuel assembly including the debris mitigation upper tie plate of an example embodiment.

FIG. 6 is an illustration of a fuel assembly including the debris mitigation upper tie plate of an example embodiment. As shown in FIG. 6, a fuel bundle 1000 of a nuclear reactor may include an outer channel 102 surrounding an upper tie plate 100 according to an example embodiment and a lower tie plate 106. A plurality of full-length fuel rods 108 and/or part length fuel rods 109 may be arranged in a matrix within the fuel bundle 1000 and pass through a plurality of spacers 105. Fuel rods 108 and 109 generally originate and terminate at the same vertical position, all rods continuously running the length of the fuel bundle 1000, with the exception of part length rods 109, which all terminate at a lower vertical position from the full length rods 108.

An example embodiment upper tie plate 100 includes a body 110 having a plurality of bosses 115 therein. Some of the plurality of bosses 117 may be longer in length than the other bosses 116. A plurality of debris capture elements 120 are formed on or connected to the plurality of bosses 117 or formed on the handle 140 of the upper tie plate 100. The plurality of debris capture elements 120 may overlap each other so as to create debris traps for particulate debris that would fall onto the fuel bundle. At least two of the plurality of debris capture elements 120 are offset from one another by a flow area 130 between the plurality of debris capture elements 120, which minimizes or reduces the resulting pressure drop caused by the debris capture elements 120.

As described above, an example embodiment of a debris mitigation upper tie plate includes a plurality of debris capture elements that allow for the falling debris to collect within. As such, the plurality of debris capture elements may prevent or reduce particulate debris from falling and damaging the fuel rods of a fuel bundle.

Example embodiments thus being described, it will be appreciated by one skilled in the art that example embodiments may be varied through routine experimentation and without further inventive activity. For example, other fuel types, shapes, and configurations may be used in conjunction with example embodiment fuel bundles and tiered tie plates. Variations are not to be regarded as departure from the spirit and scope of the exemplary embodiments, and all such modifications as would be obvious to one skilled in the art are intended to be included within the scope of the following claims.

What is claimed is:

1. An upper tie plate for use in debris mitigation, the upper tie plate comprising:
   a plurality of bosses, each boss shaped to receive an end of a nuclear fuel rod; and
   a plurality of debris capture elements above the plurality of bosses and configured to overlap such that a flow area is formed therebetween.

2. The upper tie plate of claim 1, wherein the plurality of debris capture elements are formed on or connected to at least some of the plurality of bosses or on a handle of the upper tie plate.

3. The upper tie plate of claim 1, wherein the plurality of debris capture elements are shaped as one of troughs and cones.

4. The upper tie plate of claim 1, wherein the plurality of debris capture elements are configured at an angle with respect to a vertical direction to allow debris to collect at one end.

5. The upper tie plate of claim 1, wherein sides of the debris capture elements have at least one of a triangular, rectangular, trapezoidal, and irregular shape.

6. The upper tie plate of claim 1, wherein at least two of the plurality of debris capture elements are offset from one another by the flow area.

7. The upper tie plate of claim 1, wherein the plurality of debris capture elements are formed integral with the upper tie plate.

8. The upper tie plate of claim 1, wherein the plurality of debris capture elements are coupled together in a separate assembly mounted on top of the upper tie plate.

9. The upper tie plate of claim 1, wherein the plurality of debris capture elements are staggered with respect to a vertical direction.

10. The upper tie plate of claim 9, wherein at least one of the plurality of debris capture elements are positioned at a height H1 in the vertical direction, and at least one other of the plurality of debris capture elements are positioned at a height H2 in the vertical direction, and
   wherein H2>H1.

11. A nuclear fuel bundle comprising:
a lower tie plate;
an upper tie plate including a plurality of bosses, each boss shaped to receive an end of a nuclear fuel rod, and a plurality of debris capture elements above the plurality of bosses and configured to overlap such that a flow area is formed therebetween; and
a plurality of fuel rods between the lower tie plate and the upper tie plate.

12. The nuclear fuel bundle of claim 11, wherein the plurality of debris capture elements are shaped as one of troughs and cones.

13. The nuclear fuel bundle of claim 11, wherein the plurality of debris capture elements are positioned at an angle with respect to a vertical direction to allow debris to collect at one end.

14. The nuclear fuel bundle of claim 11, wherein sides of the debris capture elements have one of a triangular, rectangular, trapezoidal, and irregular shape.

15. The nuclear fuel bundle of claim 11, wherein at least two of the plurality of debris capture elements are offset from one another by the flow area.

16. The nuclear fuel bundle of claim 11, wherein the plurality of debris capture elements are formed integral with the upper tie plate.

17. The nuclear fuel bundle of claim 11, wherein the plurality of debris capture elements are coupled together in a separate assembly mounted on top of the upper tie plate.

18. The nuclear fuel bundle of claim 11, wherein the plurality of debris capture elements are staggered with respect to a vertical direction.

19. The nuclear fuel bundle of claim 18, wherein at least one of the plurality of debris capture elements are positioned at a height H1 in the vertical direction, and at least one other of the plurality of debris capture elements are positioned at a height H2 in the vertical direction, and
wherein H2>H1.

20. The nuclear fuel bundle of claim 11, wherein the plurality of debris capture elements are formed on or connected to at least some of the plurality of bosses or on a handle of the upper tie plate.

* * * * *